United States Patent
Hand et al.

(10) Patent No.: US 9,574,592 B2
(45) Date of Patent: Feb. 21, 2017

(54) COMPOSITE SANDWICH SHELL EDGE JOINT

(71) Applicant: The Boeing Company, Chicago, IL (US)

(72) Inventors: Michael Leslie Hand, Huntington Beach, CA (US); Douglas A. McCarville, Orting, WA (US)

(73) Assignee: THE BOEING COMPANY, Chicago, IL (US)

( * ) Notice: Subject to any disclaimer, the term of this patent is extended or adjusted under 35 U.S.C. 154(b) by 452 days.

(21) Appl. No.: 14/502,018

(22) Filed: Sep. 30, 2014

(65) Prior Publication Data

US 2016/0369830 A1 Dec. 22, 2016

Related U.S. Application Data

(62) Division of application No. 12/950,144, filed on Nov. 19, 2010, now Pat. No. 8,875,931.

(51) Int. Cl.
| | |
|---|---|
| *B29C 65/70* | (2006.01) |
| *B29C 33/50* | (2006.01) |
| *F16B 11/00* | (2006.01) |
| *B29C 65/00* | (2006.01) |
| *F16B 37/04* | (2006.01) |
| *F16B 37/12* | (2006.01) |

(52) U.S. Cl.
CPC ............ *F16B 11/006* (2013.01); *B29C 33/505* (2013.01); *B29C 66/634* (2013.01); *B29C 66/72141* (2013.01); *F16B 37/047* (2013.01); *F16B 37/122* (2013.01); *Y10T 403/50* (2015.01); *Y10T 403/635* (2015.01)

(58) Field of Classification Search
CPC ............ B29C 66/721; B29C 66/72141; B29C 66/72143; B29C 66/12261; B29C 33/505
See application file for complete search history.

(56) References Cited

U.S. PATENT DOCUMENTS

| | | | |
|---|---|---|---|
| 1,561,102 | A | 11/1925 | Mott |
| 1,575,681 | A | 3/1926 | Griffiths |

(Continued)

FOREIGN PATENT DOCUMENTS

| | | |
|---|---|---|
| DE | 1501704 | 4/1969 |
| DE | 2421936 | 11/1975 |

(Continued)

OTHER PUBLICATIONS

United States Patent and Trademark Office. "Notice of Allowance," issued in connection with U.S. Appl. No. 12/950,191, Mar. 6, 2014, 18 pages.

(Continued)

*Primary Examiner* — William Bell
(74) *Attorney, Agent, or Firm* — Hanley, Flight & Zimmerman, LLC (57) ABSTRACT

A composite sandwich shell edge joint includes an outboard buildup pad, an inboard buildup pad spaced-apart and adjacent to the outboard buildup pad, an outboard face sheet extending from the outboard buildup pad, an inboard face sheet extending from the inboard buildup pad, bridging plies connecting the outboard buildup pad and the inboard buildup pad and at least one barrel nut installed in the buildup pads.

22 Claims, 7 Drawing Sheets

(56) References Cited

U.S. PATENT DOCUMENTS

| | | |
|---|---|---|
| 3,011,674 A | 12/1961 | Jackson |
| 3,285,794 A | 11/1966 | Brownlee et al. |
| 3,487,971 A | 1/1970 | Kirgis et al. |
| 3,680,727 A | 8/1972 | Pearson |
| 3,842,775 A | 10/1974 | Edwards et al. |
| 3,979,350 A | 9/1976 | Winter |
| 4,050,609 A | 9/1977 | Okamoto et al. |
| 4,106,424 A | 8/1978 | Schuler et al. |
| 4,343,413 A | 8/1982 | Chatzipetros et al. |
| 4,672,906 A | 6/1987 | Asai |
| 4,731,151 A | 3/1988 | Kaller et al. |
| 4,824,513 A | 4/1989 | Dodds |
| 4,842,670 A | 6/1989 | Callis et al. |
| 4,937,032 A | 6/1990 | Krone et al. |
| 5,024,399 A | 6/1991 | Barquet et al. |
| 5,085,343 A | 2/1992 | Scarr |
| 5,129,534 A | 7/1992 | Dunn |
| 5,143,328 A | 9/1992 | Leonard |
| 5,171,510 A | 12/1992 | Barquet et al. |
| 5,257,761 A | 11/1993 | Ratz et al. |
| 5,651,474 A | 7/1997 | Callaghan et al. |
| 5,709,252 A | 1/1998 | Princiotta et al. |
| 5,776,277 A | 7/1998 | Wambeke |
| 5,817,269 A | 10/1998 | Younie et al. |
| 6,082,676 A | 7/2000 | Cochran |
| 6,158,605 A | 12/2000 | DeLay |
| 6,802,169 B2 | 10/2004 | Simmons |
| 7,093,337 B1 | 8/2006 | Taylor |
| 7,540,143 B1 | 6/2009 | Greene |
| 7,640,961 B2 | 1/2010 | Stubner et al. |
| 7,669,729 B2 | 3/2010 | Matsuoka et al. |
| 7,699,188 B2 | 4/2010 | Oliveira et al. |
| 7,998,299 B2 | 8/2011 | McCarville et al. |
| 8,784,596 B2 | 7/2014 | Hand et al. |
| 8,875,931 B2 | 11/2014 | Hand et al. |
| 2002/0023926 A1 | 2/2002 | Dhellemmes |
| 2004/0025955 A1* | 2/2004 | Skinner ............... F16L 9/22 138/157 |
| 2004/0183227 A1 | 9/2004 | Velicki et al. |
| 2005/0126699 A1 | 6/2005 | Yen et al. |
| 2005/0260481 A1 | 11/2005 | Finkelshtain et al. |
| 2006/0115324 A1 | 6/2006 | Zenda et al. |
| 2006/0225265 A1 | 10/2006 | Burnett et al. |
| 2008/0129041 A1 | 6/2008 | Allen et al. |
| 2009/0285652 A1 | 11/2009 | Williams |
| 2010/0043955 A1 | 2/2010 | Hornick et al. |
| 2010/0065688 A1 | 3/2010 | Wood |
| 2010/0132884 A1 | 6/2010 | Baehmann et al. |
| 2010/0143148 A1 | 6/2010 | Chen et al. |
| 2011/0067795 A1 | 3/2011 | Hancock |
| 2012/0045606 A1 | 2/2012 | Griess et al. |
| 2012/0125530 A1 | 5/2012 | Hand et al. |
| 2012/0128408 A1 | 5/2012 | Hand et al. |
| 2013/0129409 A1 | 5/2013 | Cho et al. |
| 2014/0352876 A1 | 12/2014 | Hand et al. |

FOREIGN PATENT DOCUMENTS

| | | |
|---|---|---|
| DE | 19607061 | 5/1997 |
| DE | 102009015612 | 10/2010 |
| EP | 1657453 | 5/2006 |
| FR | 2236725 | 2/1975 |
| GB | 2054791 | 2/1981 |
| JP | 2001032372 | 2/2001 |
| WO | 2009038925 | 3/2009 |
| WO | 2009109619 | 9/2009 |

OTHER PUBLICATIONS

United States Patent and Trademark Office. "Non-Final Office Action." issued in connection with U.S. Appl. No. 12/950,191, Aug. 6, 2013, 11 pages.

United States Patent and Trademark Office, "Non-Final Office Action," issued in connection with U.S. Appl. No. 12/950,191, Jul. 20, 2012, 19 pages.

United States Patent and Trademark Office, "Final Office Action," issued in connection with U.S. Appl. No. 12/950,191, Jan. 31, 2013, 16 pages.

United States Patent and Trademark Office, "Restriction Requirement," issued in connection with U.S. Appl. No. 12/950,191, Apr. 30, 2012, 6 pages.

European Patent Office, Extended European Search Report, for EP Patent Application Serial No. 11188622.2, issued on May 23, 2012, (9 pages).

United States Patent and Trademark Office, "Final Office Action," issued in connection with U.S. Appl. No. 12/950,144, Dec. 19, 2012, 10 pages.

United States Patent and Trademark Office, "Final Office Action," issued in connection with U.S. Appl. No. 12/950,144, Feb. 27, 2014, 9 pages.

United States Patent and Trademark Office, "Non-Final Office Action," issued in connection with U.S. Appl. No. 12/950,144, Jun. 18, 2012, 10 pages.

United States Patent and Trademark Office, "Non-Final Office Action," issued in connection with U.S. Appl. No. 12/950,144, Sep. 25, 2013, 10 pages.

United States Patent and Trademark Office, "Notice of Allowance," issued in connection with U.S. Appl. No. 12/950,144, Aug. 12, 2014, 11 pages.

United States Patent and Trademark Office, "Non-Final Office Action," issued in connection with U.S. Appl. No. 14/298,395, mailed on Jan. 5, 2016, 21 pages.

European Patent Office, "Extended European Search Report", issued in connection with European Patent Application No. 11189988.6, issued on Jan. 18, 2016, 8 pages.

United States Patent and Trademark Office, "Final Office Action," issued in connection with U.S. Appl. No. 14/298,395, mailed on Jun. 13, 2016, 19 pages.

United States Patent and Trademark Office, "Notice of Allowance," issued in connection with U.S Appl. No. 14/298,395, mailed on Aug. 3, 2016, 19 pages.

\* cited by examiner

COMPOSITE SANDWICH SHELL EDGE JOINT

CROSS-REFERENCE TO RELATED APPLICATIONS

This application is a divisional of U.S. patent application Ser. No. 12/950,144, filed Nov. 19, 2010, now U.S. Pat. No. 8,875,931, which is hereby incorporated herein by reference in its entirety.

This application is related to U.S. patent application Ser. No. 12/950,191, filed Nov. 19, 2010, now U.S. Pat. No. 8,784,596.

TECHNICAL FIELD

The disclosure generally relates to joints for composite materials. More particularly, the disclosure relates to a highly weight-efficient, mechanically-fastened joint configuration for composite sandwich shell edges.

BACKGROUND

Sandwich construction shells, in which face sheets are joined by a shear-carrying core, are the minimum weight solution for a wide range of structures. Composite materials such as graphite/epoxy may be used to make lighter structures than the metals that were formerly applied to most weight-critical structures. Joint designs have been lagging behind the development of the acreage areas of these structures.

Joining approaches that have been traditionally used for metal structures may not be applied unmodified to composite structures because of the lack of ductility in composites and limited bearing capability of thin composite face sheets. Sandwich structures may present further challenges since the face sheet-to-core bond may be compromised in combined shear and peel if subjected to concentrated loads. The state of the art attempts to avoid these problems by transitioning from sandwich construction to thick solid laminates at the edge of the shell and then using a metal joint member which can be fastened conventionally. However, the cost of mechanically attaching metal frames to solid laminate may be high due to the requirement to drill a large number of close tolerance holes in the composite.

An additional shortcoming associated with many conventional sandwich edge joints is that the joints may transition to an asymmetrical flange configuration which may cause tension loads across the joint to put the adjacent shell in bending. To carry these secondary bending loads in addition to the primary in-plane loads, it may be necessary to locally reinforce the shell. This may add additional weight that may not be required in a joint structure with straighter load paths.

Coefficient of thermal expansion mismatch between metal joint elements and adjacent composites may result in additional stresses in the structure. For structures which are exposed to wide ranges of temperatures, such as launch vehicle components, substantial weight penalties may be imposed by the need to either reinforce the structure to carry these mismatch loads or soften the structure radially to mitigate strain mismatch.

Therefore, a highly weight-efficient, combination bonded and mechanically-fastened joint configuration for composite sandwich shell edges is needed.

SUMMARY

The disclosure is generally directed to a highly weight-efficient, combination bonded and mechanically-fastened composite sandwich shell edge joint. An illustrative embodiment of the joint includes an outboard buildup pad, an inboard buildup pad spaced-apart and adjacent to the outboard buildup pad, an outboard face sheet extending from the outboard buildup pad, an inboard face sheet extending from the inboard buildup pad, bridging plies connecting the inboard buildup pad and the outboard buildup pad and at least one barrel nut installed in the buildup pads.

The disclosure is further generally directed to a method of fabricating a composite sandwich shell edge joint. An illustrative embodiment of the method includes providing inboard and outboard buildup pads and bridging plies connecting the inboard and outboard buildup pads, providing inboard and outboard face sheets and co-curing, co-bonding or bonding the inboard and outboard face sheets to the inboard and outboard buildup pads, respectively.

In some embodiments, the method of fabricating a composite sandwich shell edge joint may include co-bonding inboard and outboard buildup pads to previously-cured inboard and outboard face sheets, leaving a tapered gap between the buildup pads that is subsequently closed by bonding a pre-cured tapered closeout wedge to fill the gap.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

Referring initially to FIGS. 1-3 and 5-8B, an illustrative embodiment of the composite sandwich shell edge joint, hereinafter joint, is generally indicated by reference numeral 1. In some applications, the joint 1 may be applied as a skirt end joint on a composite cryotank 34 used for launch vehicles in the aerospace industry. However, it is to be understood that the joint 1 may be applicable to joining composite materials in any other type of structure and may serve as a minimum weight solution for a wide range of structures in various industries. The joint 1 may achieve greater efficiencies than conventional joints for weight-critical applications such as aerospace structures, for example and without limitation. The joint 1 may be an all-composite joint, thereby avoiding the manufacturing and stress problems rising from coefficient of thermal expansion mismatch in hybrid joints with metal rings attached to composite shells.

Figure 1:
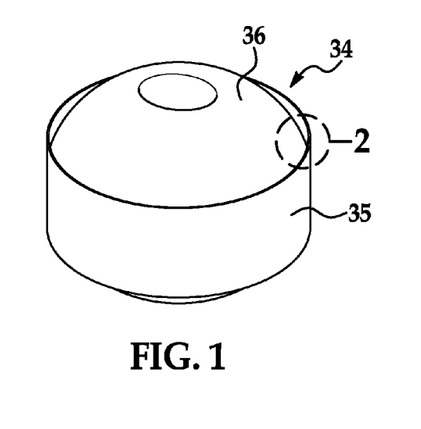
FIG. 1 is a perspective view of a composite cryotank in implementation of an illustrative embodiment of the composite sandwich shell edge joint.
Figure 2:
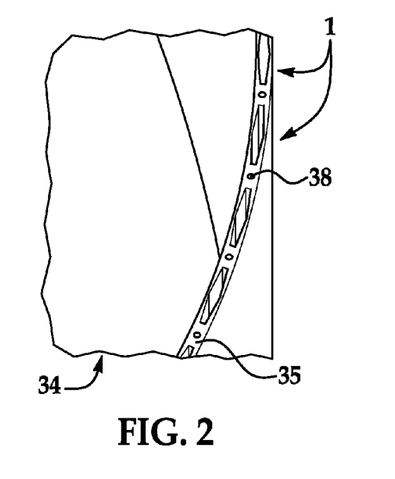
FIG. 2 is an oblique view of a composite cryotank skirt edge.
Figure 3:
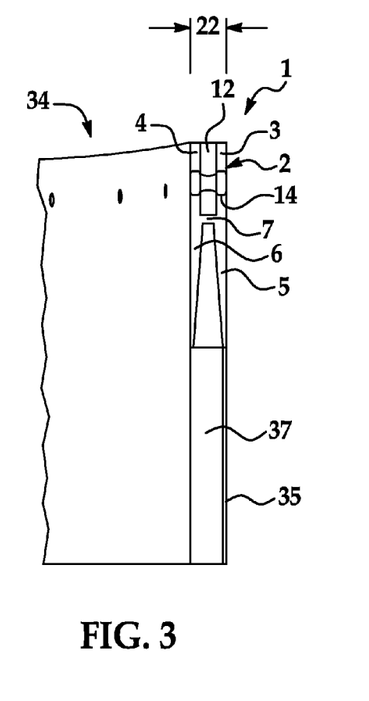
FIG. 3 is a sectional view of an illustrative embodiment of the composite sandwich shell edge joint in which the entire joint buildup has been cured in place in a single co-bond step.
Figure 6:
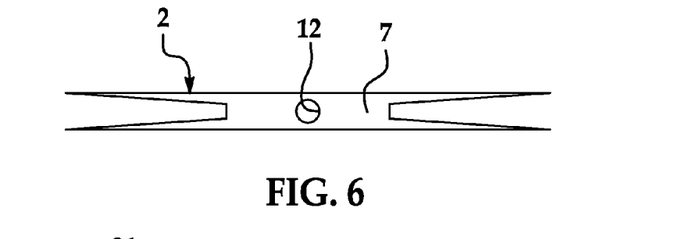
FIG. 6 is a top view of a joint body component of an illustrative embodiment of the composite sandwich shell edge joint.
Figures 7, 8:
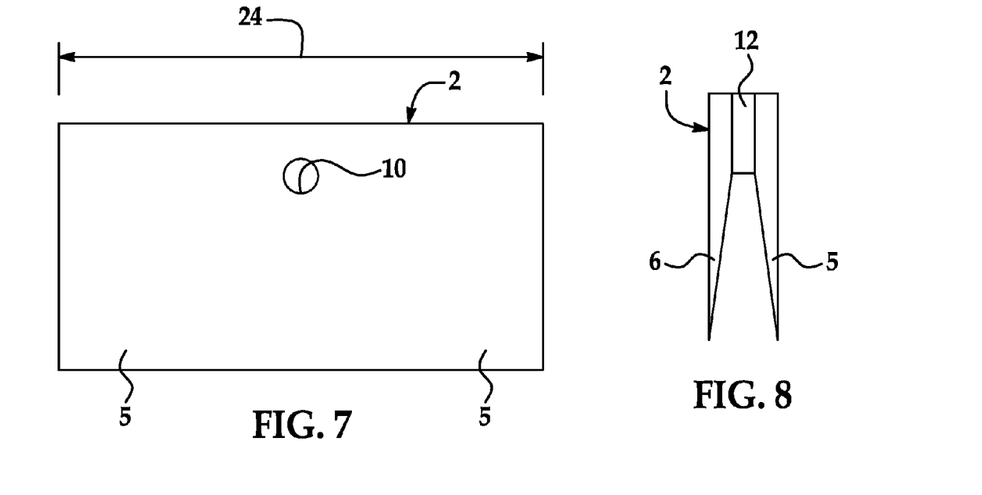
FIG. 7 is an exterior view of the joint body of the composite sandwich shell edge joint illustrated in FIG. 6.
FIG. 8 is a side view of the joint body of the composite sandwich shell edge joint illustrated in FIG. 6.

As shown in FIG. 1, the composite cryotank 34 may include a generally cylindrical tank wall 35 and a tank dome 36 on the tank wall 35. As shown in FIG. 3, the tank wall 35 may include a fluted core 37. Multiple joints 1 may be arranged in adjacent relationship to each other on the fluted core 37 and along the edge of the tank wall 35. As illustrated in FIG. 3, each joint 1 may include a joint body 2 having an outboard tapered buildup pad 5; an inboard tapered buildup pad 6; and bridging plies 7 which connect the outboard tapered buildup pad 5 and the inboard tapered buildup pad 6. An outboard face sheet 3 may be co-co-cured, co-bonded or bonded to the outboard tapered buildup pad 5. An inboard face sheet 4 may be co-co-cured, co-bonded or bonded to the inboard tapered buildup pad 6. As shown in FIG. 6, a bolt opening 12 may extend into an upper edge of the joint body 2. As shown in FIG. 7, a barrel nut opening 10 may extend through the thickness of the outboard face sheet 3 and the inboard face sheet 4 of the joint body 2 for purposes which will be hereinafter described.

As further shown in FIG. 3, a barrel nut 14 may extend through the barrel nut opening 10. The barrel nut 14 may be a standard fastener type which is well-suited to incorporation in the joint 1. The barrel nut 14 may be positioned so that the interfacing fastener centerline is nominally located on the center surface of the sandwich shell which is defined by the outboard face sheet 3 and the inboard face sheet 4. This placement of the barrel nut 14 may minimize bending loads being introduced into the tank wall 35 by limiting loading to mainly tension loads transmitted through the barrel nut. In some applications, if needed, additional joint strength may be obtained by using custom barrel nuts with a larger surface area in bearing against the bridging plies 7 and face sheets 3 and 4 and/or with radiused corners at the ends of the cylindrical nut body of the barrel nut. The number of joints 1, hence barrel nuts 14, which are used in a given application can be determined by the tensile line load that each joint 1 must carry.

Figure 5:
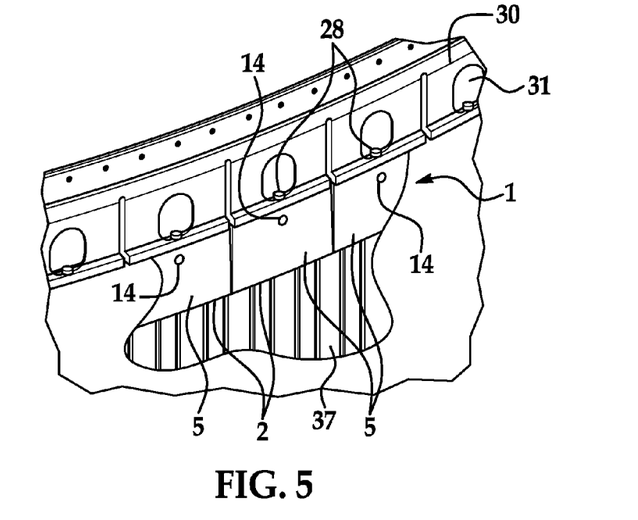
FIG. 5 is an exterior view of the tank wall of a composite cryotank, partially in section, with multiple composite sandwich shell edge joints provided along the tank wall.

The mating side of the joint 1 may incorporate a male threaded fastener to engage the barrel nut 14. A variety of conventional joint types may be suitable for the purpose. In some applications, for example, a finger ring 30 having "mouse holes" 31 may be used for this purpose, as shown in FIG. 5. The finger ring 30 may be fastened to each joint 1 by extending a bolt 28 through a bolt opening (not shown) in the finger ring 30 and inserting the bolt 28 into the barrel nut installed in the joint body 2 of the joint 1. The opening in the cryotank skirt joint that allows the bolt to reach the barrel nut is shown as 38 in FIG. 2.

The composite outboard tapered buildup pad 5 and inboard tapered buildup pad 6 of the joint body 2 may be configured to efficiently transfer load from the barrel nut 14 to the outboard face sheet 3 and the inboard face sheet 4. Fabrication methods may provide good clamp-up pressure to the film adhesive bondlines between the buildup pads 5, 6 and face sheets 3, 4. A thin, uniform, bondline is stronger than a thick bondline or one with varying thickness across the bond.

Figure 8A:
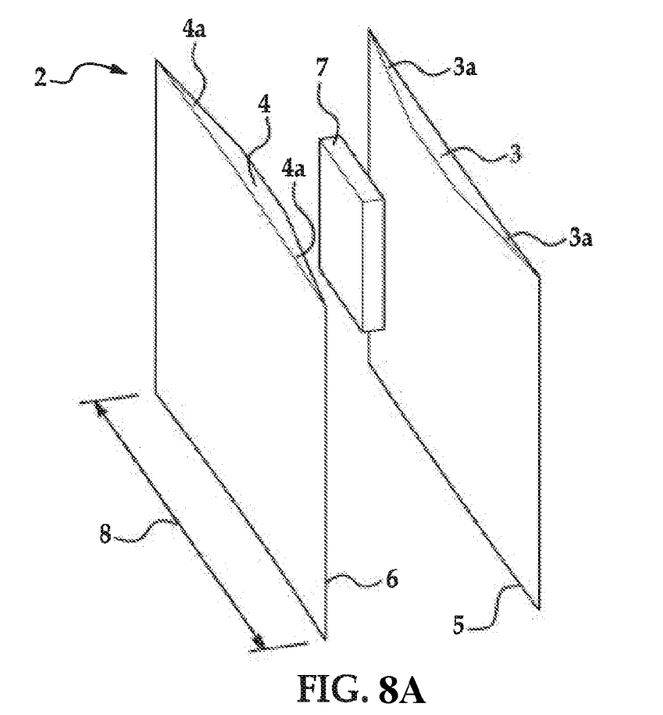
FIG. 8A is an exploded perspective view of a joint body component of an illustrative embodiment of the composite sandwich shell edge joint.

Overall pad width 22 (FIG. 3) of each buildup pad 5, 6 may be chosen to minimize the unsupported length of the face sheet 3, 4 between pads 5, 6. The width 22 of the pads 5, 6 at their interface to the bridging plies 7 may be chosen to provide sufficient area to meet the joint compressive line load requirements. Pad length 24 (FIG. 7), at right angles to the joint edge, may be dictated by the length of solid laminate required to transfer loads from the bridging plies 7 to the pads 5, 6 plus the length of tapered flange required to shear load into the face sheets 3, 4 without delamination. As illustrated in FIG. 8A, the extensions 3a, 4a of the face sheets 3, 4, respectively, past the bridging plies 7 may be chosen to match the fore-and-aft length 8 of the buildup pads 5, 6, so that there may be a minimal length of unsupported face sheet 3, 4 between the bridging plies 7 and the pads 5, 6.

Figure 8B:
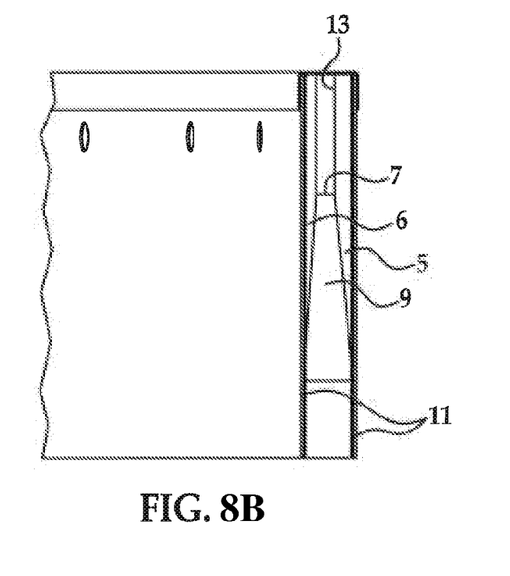
FIG. 8B is a sectional view of a sandwich shell edge joint with tapering buildup pads extending toward bridging plies to form a natural plenum for distributing flows between flutes.

Each buildup pad 5, 6 may be thickest in the area where the barrel nut 14 is installed and may taper toward the edges. The thin edges on the build-up pads 5, 6 may reduce shear peaking to maximize attainable bonded joint strength. Fluted cores, for example and without limitation, may be a good candidate for launch vehicle composite sandwich structures because of their suitability for pre-launch purging. FIG. 8B illustrates how the two tapering buildup pads 5, 6 extending toward the bridging plies 7 form a natural plenum 9 for distributing flows between flutes 11. In this instance, purge requirements may lead to extending the longitudinal flanges of the buildup pads 5, 6 to increase the cross-sectional area of the plenum 9 they naturally form. Depending on whether purge flows are to be immediately vented overboard or collected for disposal at some distance from the launch pad, venting cutouts (not illustrated) may be added to the skirt ends between barrel nut installations or a closeout channel 13 may be added over the component-to-component interface surface to seal off the plenum 9.

Solid laminate may be required across the section in which each barrel nut 14 is installed. This may be obtained by placing the bridging plies 7 between the two buildup pads 5, 6. Since the bridging plies 7 may pick up only a small fraction of the load transmitted through the barrel nut 14, the joints between the bridging plies 7 and the buildup pads 5, 6 may be less critical than the bonded joints between the buildup pads 5, 6 and the face sheets 3, 4.

Figure 4:
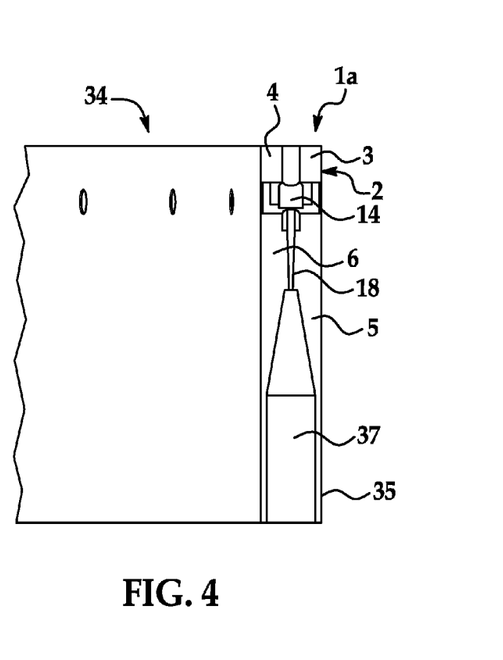
FIG. 4 is a sectional view of a sandwich shell edge joint with pre-cured wedge for bridging plies in the joint.

Referring next to FIG. 4, in some embodiments of the joint 1a, pre-cured bridging plies in the form of a closeout wedge 18 may be formed in a wedge configuration. The wedge draft angle of the closeout wedge 18 may allow bonding of the bridging material in place without the need to fabricate the adherends to close tolerances. The closeout wedge 18 may be bonded in place in a configuration that is longer than its nominal trimmed length to allow for the gap being wider than nominal or the closeout wedge 18 being thinner than nominal. After the closeout wedge bondlines have cured, the entire joint faying surface may be faced off flat to provide the contact zone through which compressive loads may be transferred through the joint 1a. In some embodiments, the interior faces of the build-up pads 5, 6 may be tapered to facilitate installation of the closeout wedge 18 between the build-up pads 5, 6.

The joint 1 of the disclosure is relatively easy to manufacture, avoiding the costly drilling of a large number of precision holes in composites needed to mechanically splice a metal ring to a composite shell. This can be accomplished because the composite buildup pads 5, 6 can be adhesively bonded to the sandwich face sheets 3, 4 and may not require the large number of mechanical fasteners that are used in existing solutions in which metal rings are bolted to composite sandwich edge extensions.

Figures 9, 10, 11:
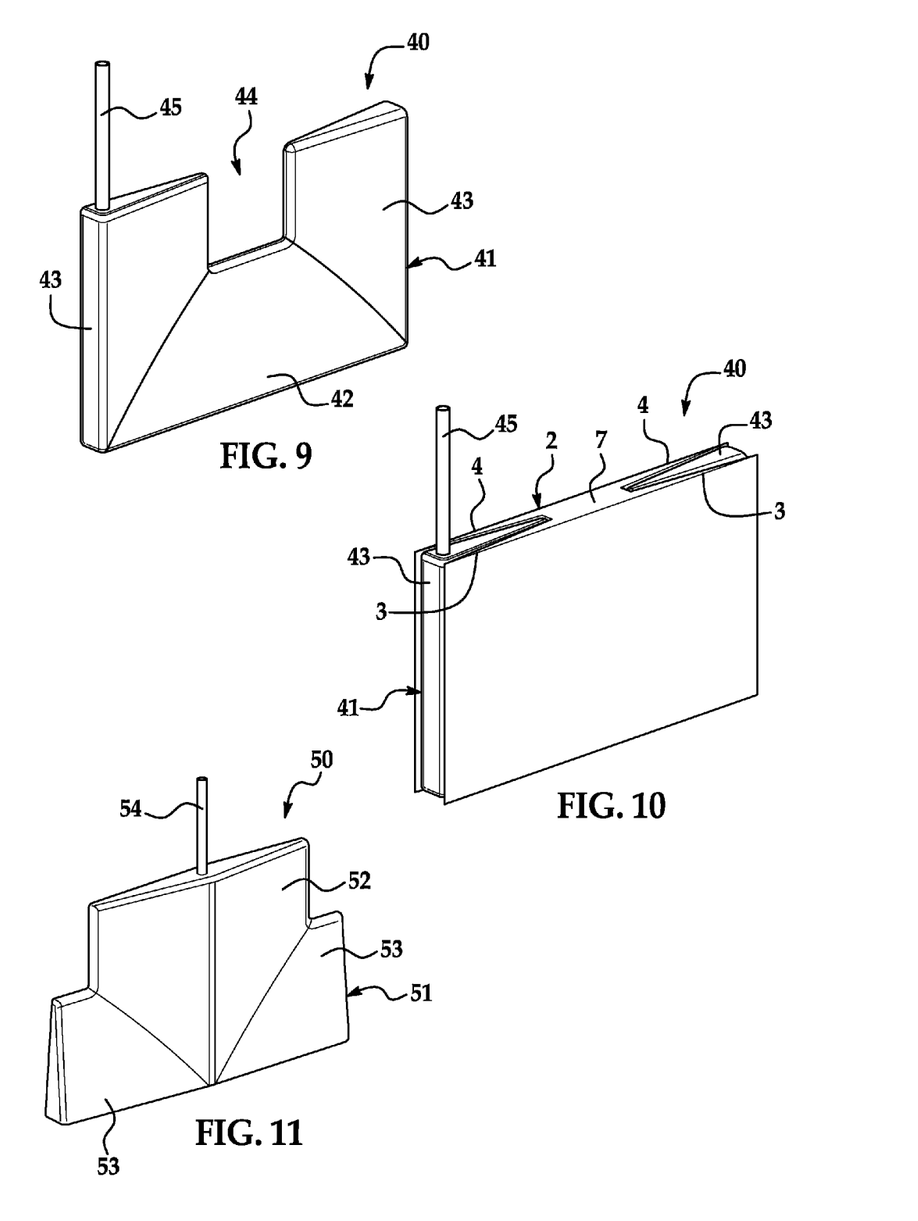
FIG. 9 is a perspective view of a U-shaped inflatable collar tool which is suitable for fabrication of the joint body of the composite sandwich shell edge joint.
FIG. 10 is a perspective view illustrating fabrication of the joint body of the composite sandwich shell joint using the U-shaped inflatable collar tool illustrated in FIG. 9.
FIG. 11 is a perspective view of an inverted T-shaped inflatable collar tool which is suitable for fabrication of the joint body of the composite sandwich shell edge joint.

Referring next to FIGS. 9 and 10, an illustrative method of fabricating a joint body 2 of a composite sandwich shell edge joint 1 is shown. A generally U-shaped inflatable collar tool 40 may be used to support the composite build-up plies of the joint body 2 during fabrication. The collar tool 40 may include an inflatable tool bag 41 having a middle tool section 42 and side tool sections 43 which extend from the opposite ends of the middle tool section 42. A tool notch 44 may be between the side tool sections 43 of the tool bag 41. An inflation stem 45 may be disposed in fluid communication with the side tool sections 43. In fabrication of the joint body 2, the joint buildup 5 and 6 and the bridging plies 7 (as shown in FIG. 10) may be assembled in an uncured or green partially-cured (or c-staged or combined) state. After inflation of the collar tool 40 by introduction of air through the inflation stem 45, the buildup pads may be supported with the collar tool 40 during cure and pushed to a desired contour in a closed mold (not shown) and the buildup pads co-bonded to the facesheets. It should also be noted that the collar tool 40 could be made of rubber or high expansion metal (such as aluminum) and serve the same purpose. After curing, the tool bag 41 may be deflated and then removed from the joint body 2 through the open areas defined by the tapers between the buildup pads.

Figure 12:
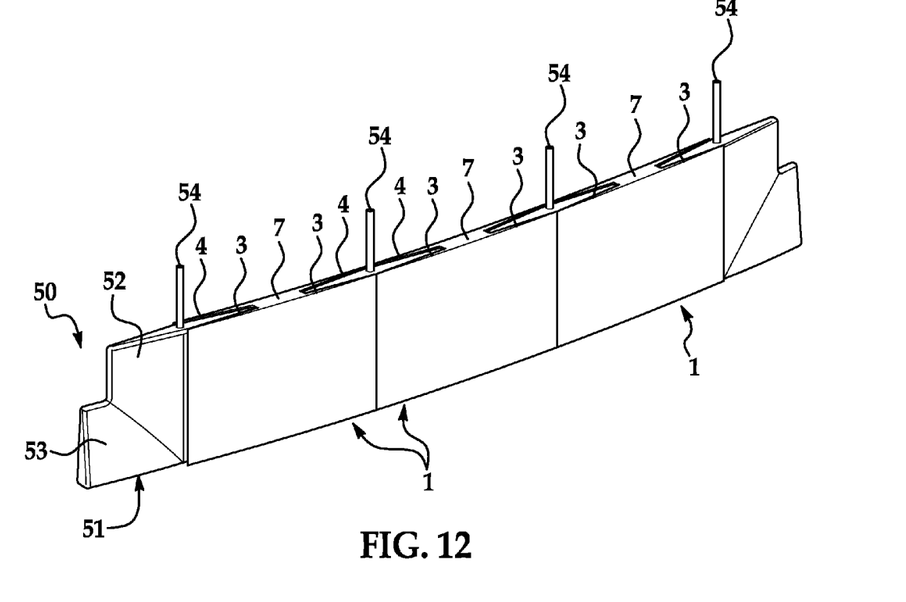
FIG. 12 is a perspective view illustrating fabrication of multiple joint bodies of the composite sandwich shell joint using multiple inverted T-shaped inflatable collar tools illustrated in FIG. 11.
Figure 13:
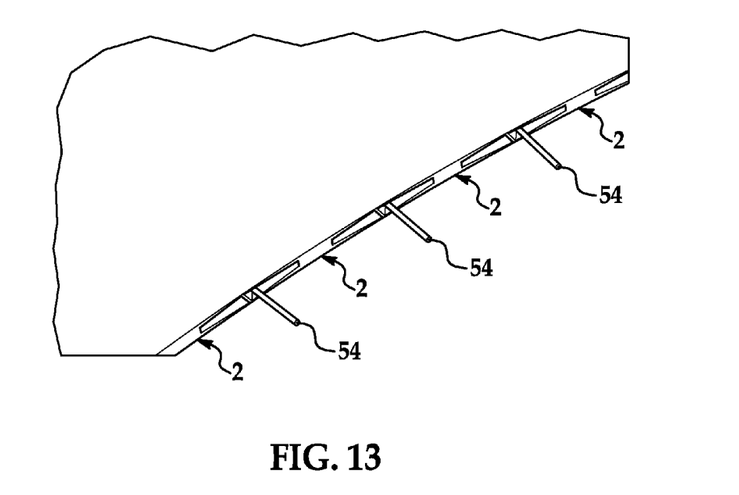
FIG. 13 is a perspective view illustrating fabrication of multiple joint bodies of the composite sandwich shell joint using multiple inverted T-shaped inflatable collar tools illustrated in FIG. 11, with the joint buildups installed between facesheets of a sandwich construction skirt.

Referring next to FIGS. 11-13, an alternative illustrative method of fabricating a joint body 2 of a composite sandwich shell edge joint 1 is shown. A generally inverted T-shaped inflatable collar tool 50 may be used to support the composite build-up plies of the joint body 2 during fabrication. The collar tool 50 may include a tool bag 51 having a middle tool section 52. Side tool sections 53 may extend from the opposite ends of the middle tool section 52. An inflation stem 54 may be disposed in fluid communication with the middle tool section 52 and the side tool sections 53. The composite plies which form the joint body 2 of a first joint 1 may be placed on one side tool section 53 and half of the middle tool section 52 of the tool bag 51 (as shown on FIG. 12). The composite plies which form the joint body 2 of a second joint 1 may be placed on the other side tool section 53 and the other half of the middle tool section 52 of the tool bag 51. The tool bag 51 may be inflated by forcing fluid (not shown) into the tool bag 51 through the inflation stem 54, imparting the shape of the joint body 2 to the composite plies. After curing, the tool bag 51 may be deflated and removed from the joint body 2. Therefore, as shown in FIGS. 12 and 13, each collar tool 50 may be used to fabricate a half of a first joint body 2 and a half of an adjacent second joint body 2. Accordingly, multiple collar tools 50 may be used to fabricate a continuous succession of adjacent joint bodies 2 either independently or during the bond of joints 1 on the tank wall 35 of the composite cryotank 34, as shown in FIG. 13. As with collar tool 40, it should also be noted that collar tool 50 could be made of rubber or high expansion metal (such as aluminum) when making independent joint bodies 2. If the joint bodies 2 are being cured at the same time they are being bonded to the tank wall 35 (FIG. 1) then the collar tools 50 must be made out of an inflatable/collapsible material (e.g., silicon rubber) or a material that can be sacrificially destroyed after the cure (e.g. washout plaster).

Figure 14:
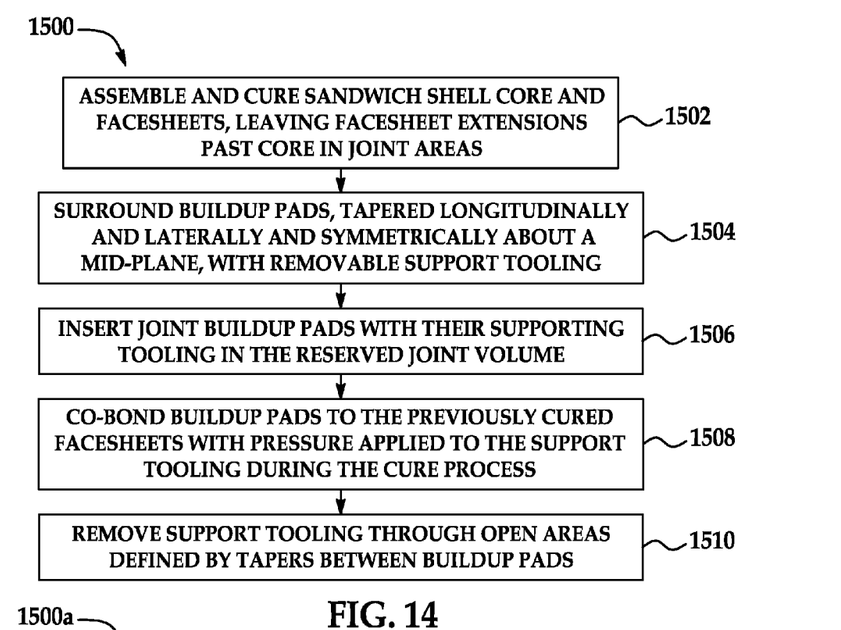
FIG. 14 is a flow diagram of an illustrative embodiment of a method of fabricating a composite sandwich shell edge joint in which joint buildups are cured in place in a single co-bond step.

Referring next to FIG. 14, a flow diagram 1500 of an illustrative embodiment of a method of fabricating a composite sandwich shell edge joint is shown. In block 1502, sandwich shell core and facesheets are assembled and cured, leaving facesheet extensions past core in joint areas. In block 1504, buildup pads, tapered longitudinally and laterally and symmetrical about a mid-plane, are surrounded with removable support tooling. In block 1506, the joint build-up pads with their supporting tooling are inserted in the reserved joint volume. In block 1508, the buildup pads are co-bonded to the previously-cured facesheets with pressure applied to the bondline by the support tooling during the cure process. In block 1510, the support tooling is removed through the open areas defined by tapers between the buildup pads.

Figure 15:
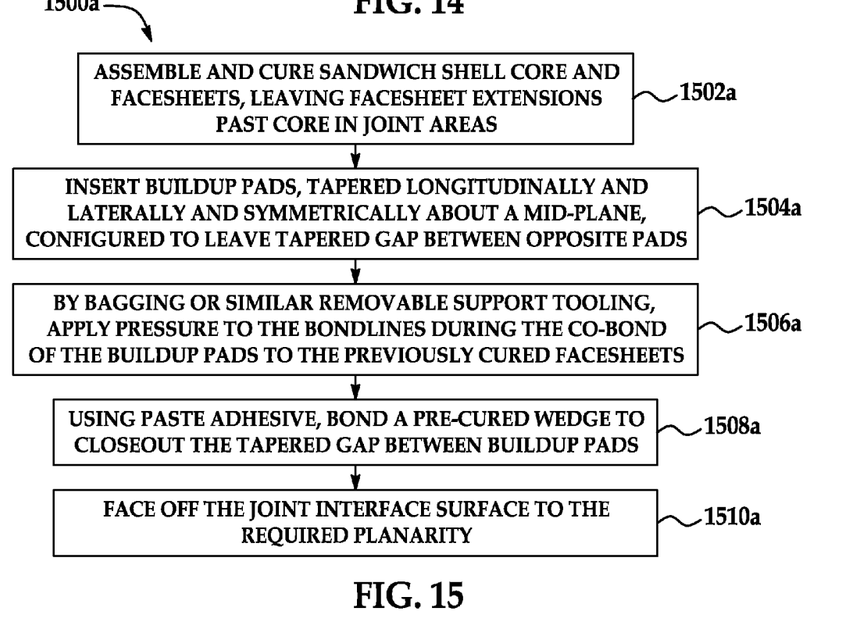
FIG. 15 is a flow diagram of an alternative illustrative embodiment of a method of fabricating a composite sandwich shell edge joint in which buildups are individually co-bonded to their respective facesheets. After completion of the co-bond, a pre-cured wedge is bonded between the two buildups to complete the joint reinforcement.

Referring next to FIG. 15, a flow diagram 1500a of an alternative illustrative embodiment of a method of fabricating a composite sandwich shell edge joint is shown. In block 1502a, green, pre-cured or some combination of sandwich shell core and face sheets are assembled, leaving facesheet extensions past core in joint areas. In block 1504a, buildup pads, tapered longitudinally and laterally and symmetrical about a mid-plane, are inserted and configured to leave a tapered gap between the opposite buildup pads. In block 1506a, by bagging or similar removable support tooling, pressure is applied to the bondlines during co-bonding of the buildup pads to the previously cured facesheets. In block 1508a, using a paste adhesive, a pre-cured wedge is bonded to close out the tapered gap between the buildup pads. In block 1510a, the joint interface surface is faced off to the required planarity.

Figure 16:
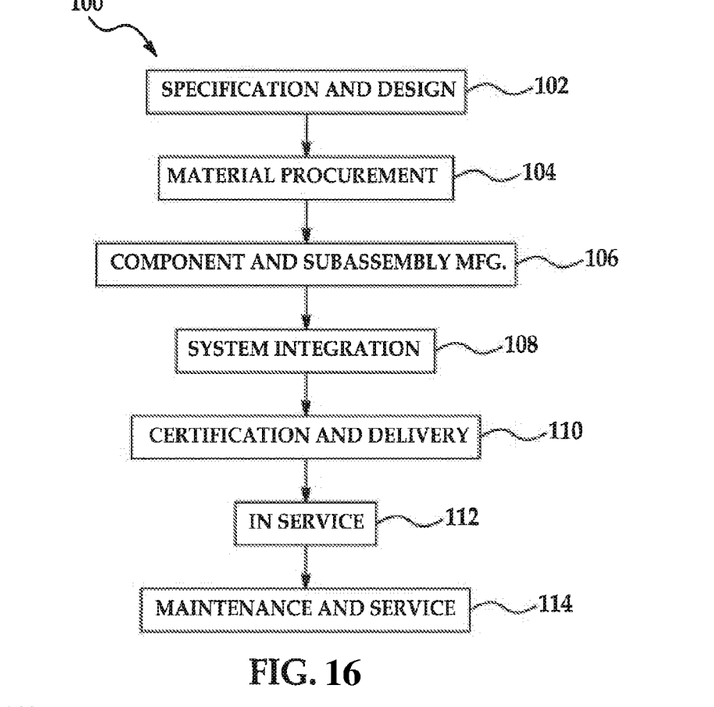
FIG. 16 is a flow diagram of a spacecraft production and service methodology.
Figure 17:
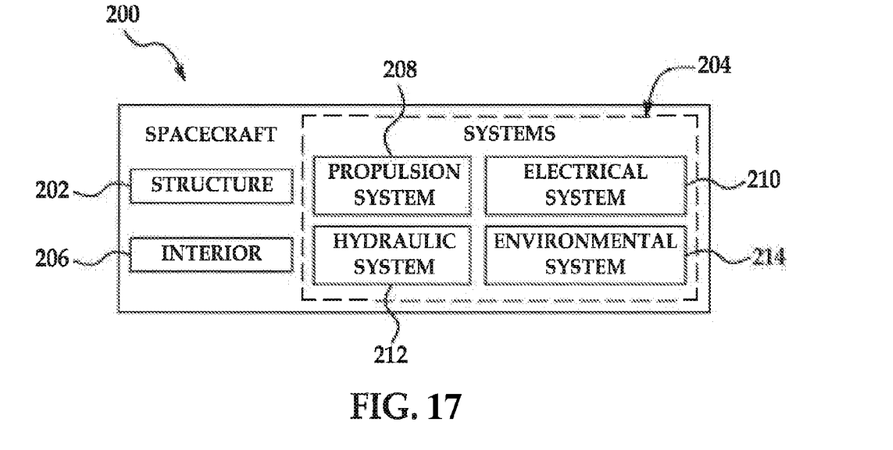
FIG. 17 is a block diagram of a spacecraft.

Referring next to FIGS. 16 and 17, embodiments of the disclosure may be used in the context of a spacecraft manufacturing and service method 100 as shown in FIG. 16 and a spacecraft 200 as shown in FIG. 17. During pre-production, exemplary method 100 may include specification and design 102 of the spacecraft 200 and material procurement 104. During production, component and sub-assembly manufacturing 106 and system integration 108 of the spacecraft 200 takes place. Thereafter, the spacecraft 200 may go through certification and delivery 110 in order to be placed in service 112. While in service by a customer, the spacecraft 200 may be scheduled for routine maintenance and service 114 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the spacecraft 200 produced by exemplary method 100 may include a structure 202 with a plurality of systems 204 and an interior 206. Examples of high-level systems 204 include one or more of a propulsion system 208, an electrical system 210, a hydraulic system 212, and an environmental system 214. Any number of other systems may be included. Although an aerospace example is shown, the principles of the invention may be applied to other industries, such as the automotive industry.

The apparatus embodied herein may be employed during any one or more of the stages of the production and service method 100. For example, components or subassemblies corresponding to production process 106 may be fabricated or manufactured in a manner similar to components or subassemblies produced while the spacecraft 200 is in service. Also one or more apparatus embodiments may be utilized during the production stages 106 and 108, for example, by substantially expediting assembly of or reducing the cost of a spacecraft 200. Similarly, one or more apparatus embodiments may be utilized while the spacecraft 200 is in service, for example and without limitation, to maintenance and service 114.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite sandwich shell edge joint, comprising:
    providing an outboard buildup pad spaced apart from an inboard buildup pad, the outboard buildup pad including a first tapered portion, the inboard buildup pad including a second tapered portion opposite the first tapered portion of the outboard buildup pad;
    placing support tooling in areas defined by the first tapered portion and the second tapered portion; and
    while applying pressure to the support tooling, bonding an outboard face sheet to the outboard buildup pad and bonding an inboard face sheet with the inboard buildup pad, wherein applying pressure to the support tooling comprises inflating the support tooling.

2. The method of claim 1, further comprising removing the support tooling after the bonding the areas defined by the first and second tapered portions.

3. The method of claim 1, wherein the support tooling comprises a U-shaped tool bag.

4. The method of claim 1, wherein the support tooling comprises an inverted T-shaped tool bag.

5. The method of claim 1, wherein the first tapered portion of the outboard buildup pad tapers in thickness in a first direction and a second direction.

6. The method of claim 1, wherein the second tapered portion of the inboard buildup pad tapers in thickness in a first direction and a second direction.

7. The method of claim 1, wherein the first tapered portion of the outboard buildup pad tapers in thickness in a first direction and a second direction, and wherein the second tapered portion of the inboard buildup pad tapers in thickness in a third direction and a fourth direction.

8. The method of claim 1, further comprising providing bridging plies between the inboard and outboard buildup pads, wherein the first tapered portion of the outboard buildup pad tapers away from the bridging plies in first and second directions, and wherein the second tapered portion on the inboard buildup pad tapers away from the bridging plies in third and fourth directions.

9. A method of fabricating a composite sandwich shell edge joint, comprising:
    providing an outboard buildup pad spaced apart from an inboard buildup pad, the outboard buildup pad including a first tapered portion, the inboard buildup pad including a second tapered portion opposite the first tapered portion of the outboard buildup pad;
    placing support tooling in areas defined by the first tapered portion and the second tapered portion;
    while applying pressure to the support tooling, bonding an outboard face sheet to the outboard buildup pad and bonding an inboard face sheet with the inboard buildup pad; and
    providing bridging plies between the inboard and outboard buildup pads, wherein the first tapered portion of the outboard buildup pad tapers away from the bridging plies in first and second directions, and wherein the second tapered portion on the inboard buildup pad tapers away from the bridging plies in third and fourth directions, wherein the first direction is perpendicular to the second direction, and wherein the third direction is perpendicular to the fourth direction.

10. The method of claim 9, further comprising removing the support tooling after the bonding the areas defined by the first and second tapered portions.

11. The method of claim 9, wherein applying pressure to the support tooling comprises inflating the support tooling.

12. The method of claim 9, wherein the support tooling comprises a U-shaped tool bag.

13. The method of claim 9, wherein the support tooling comprises an inverted T-shaped tool bag.

14. A method of fabricating a composite sandwich shell edge joint, comprising:
    defining a tapered gap between an outer buildup pad and an inner buildup pad, the outer buildup pad including a first tapered portion, the inner buildup pad including a second tapered portion opposite the first tapered portion of the outer buildup pad;

providing a tapered closeout wedge between the inner buildup pad and the outer buildup pad; and bonding the inner and outer buildup pads to inner and outer face sheets prior to bonding the closeout wedge between the inner and outer buildup pads.

15. The method of claim 14, further comprising supporting the inner and outer face sheets with support tooling while bonding the inner and outer buildup pads to the inner and outer face sheets.

16. The method of claim 15, wherein supporting the inner and outer face sheets with the support tooling comprises inflating a U-shaped tool bag.

17. The method of claim 15, wherein supporting the inner and outer face sheets with the support tooling comprises inflating an inverted T-shaped tool bag.

18. The method of claim 14, wherein the first tapered portion of the outer buildup pad tapers in thickness in a first direction and a second direction.

19. The method of claim 14, wherein the second tapered portion of the inner buildup pad tapers in thickness in a first direction and a second direction.

20. The method of claim 14, wherein the first tapered portion of the outer buildup pad tapers in thickness in a first direction and a second direction, and wherein the second tapered portion of the inner buildup pad tapers in thickness in a third direction and a fourth direction.

21. The method of claim 14, wherein the first tapered portion of the outer buildup pad tapers away from the closeout wedge in first and second directions, and wherein the second tapered portion on the inner buildup pad tapers away from the closeout wedge in third and fourth directions.

22. The method of claim 21, wherein the first direction is perpendicular to the second direction, and wherein the third direction is perpendicular to the fourth direction.

* * * * *